(12) United States Patent
Goldsmith

(10) Patent No.: US 7,177,526 B2
(45) Date of Patent: Feb. 13, 2007

(54) SYSTEM AND METHOD FOR IMPROVING AUDIO DURING POST-PRODUCTION OF VIDEO RECORDINGS

(75) Inventor: Michael A Goldsmith, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1140 days.

(21) Appl. No.: 10/184,707

(22) Filed: Jun. 28, 2002

(65) Prior Publication Data

US 2004/0001689 A1    Jan. 1, 2004

(51) Int. Cl.
*H04N 7/52*    (2006.01)

(52) U.S. Cl. .............................. 386/94; 381/56; 381/58

(58) Field of Classification Search ................ 381/56, 381/58, 61, 101; 386/39, 46, 96–101
See application file for complete search history.

(56) References Cited

U.S. PATENT DOCUMENTS 6,694,126 B1 *    2/2004   Van Lente ................. 455/66.1

* cited by examiner

*Primary Examiner*—Thai Q. Tran
*Assistant Examiner*—Mishawn Dunn
(74) *Attorney, Agent, or Firm*—Kacvinsky LLC

(57) ABSTRACT

A system and method for improving audio quality, by means of signal processing on a computer, during post-production of recordings is disclosed. A recording of a "chirp" tone at the beginning of a scene is followed by analysis of the recorded chirp on the computer. For the acoustic signature of the recorded chirp, the computer can characterize the acoustic environment in which the recording was made and use those characteristics to improve the remainder of the audio. The processing that can be achieved by the computer includes, but is not limited to, frequency response correction and acoustic echo cancellation. A physical device for generating the chirp may be pre-built into a video recorder or may be an add-on device placed in physical proximity to the video recorder while the chirp is generated.

26 Claims, 2 Drawing Sheets

SYSTEM AND METHOD FOR IMPROVING AUDIO DURING POST-PRODUCTION OF VIDEO RECORDINGS

BACKGROUND

1. Technical Field

Embodiments described herein are directed to a system and method for improving the audio quality of video recordings. Specifically, audio quality of video recordings during post-production is improved by means of signal processing on a computer.

2. Related Art

The analysis of a "chirp" sound to characterize room acoustics has been implemented in various settings in the past. Principles of frequency response correction and echo cancellation are further known. Frequency response is a term used to define the performance or behavior of a filter, antenna system, microphone, speaker, or headphone. Methods of frequency response correction serve to smooth various undesirable peaks and valleys in attenuation-versus-frequency functions of some systems. Echo cancellation involves the removal of unwanted echoes from a signal.

The recording and subsequent analysis of a "chirp" tone would thus prove useful for improving the audio quality of video recordings, as such a feature on a video recorder has not yet been implemented.

BRIEF DESCRIPTION OF THE DRAWINGS

A detailed description of embodiments of the invention will be made with reference to the accompanying drawings, wherein like numerals designate corresponding parts in the figures.

DETAILED DESCRIPTION

Figure 1:
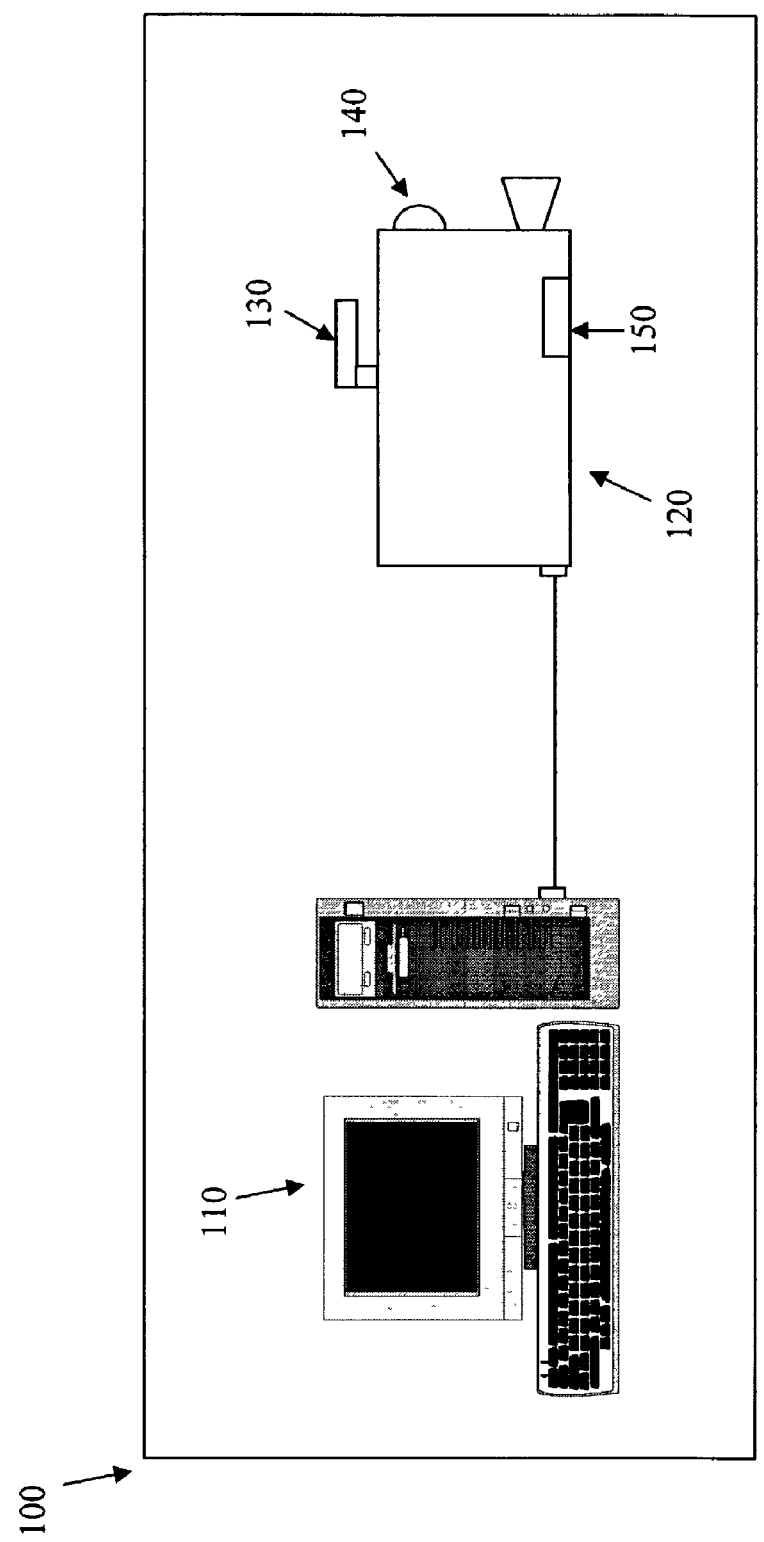
FIG. 1 is a diagram of the components of a system for improving audio quality of video recordings during post-production, according to an embodiment of the present invention.

The following paragraphs describe a method and system for improving the audio quality of video recordings during post-production by means of signal processing on a computer. FIG. 1 depicts the components that constitute a system for improving the audio quality of video recordings 100. A recording of a "chirp" tone at the commencement of a scene is followed by an analysis of the recorded chirp on a computer 110. A skilled artisan will note that any tone can be characterized. For example, the recorded chirp tone may vary based on different frequencies and chirp durations. The computer 110 may be a desktop, notebook, personal digital assistant or other handheld device, or any other suitable computing device. For an acoustic signature of the recorded chirp, the computer 110 characterizes the acoustic environment in which the recording was made and uses those characteristics to improve the remainder of the audio.

A physical device 150 for generating the chirp can either be built into a video recorder 120 by the manufacturer or may be an add-on device that is purchased by a user and placed in physical proximity to the video recorder 120 while the chirp is generated. Building the chirp device 150 into the video recorder 120 has the advantage of both physical form-factor ease of use and an automatic trigger capability by the user whenever the user activates the record mode of the video recorder 120. The video recorder 120 is equipped with a standard microphone 130 and a speaker 140 for emitting the chirp sound. The video recorder 120 may be of either the analog or digital variety. The video recorder 120 may be a hand-held video recorder aimed at personal use or may be a larger, industrial-sized video recorder used for commercial purposes. The computer 110 may also be built into the video recorder 120.

When used with video recorder 120, sufficient information is available on the recording for an automatic post-processing of the audio data. The computer 110 can locate scene changes in the data portion of the video stream and use these locations to find the chirp and to associate the audio characterization with a section of the recording. Other than by using such digitally-encoded time stamps, the chirp may be found by simply searching the audio stream or by optically detecting scene changes and thus localizing the search for the chirp.

The processing that may be done by the computer 110 includes, for example, frequency response correction and acoustic echo cancellation. The signal processing may be achieved through use of a digital signal processor, an application specific integrated circuit ("ASIC") having a microprocessor, specialized software, or other suitable means. If a digital signal processor is used and the video recorder 120 is not of the digital variety, an analog-to-digital converter may be used to convert the analog signals to digital signals before processing commences.

An acoustic echo canceller records a sound as it travels to the speaker 140 and subtracts it from the signal that is emitted from the microphone 130. That is, if x is the input signal going to the speaker 140, d is the desired signal that is picked up by the microphone 130. The signal after subtraction is the error signal and is denoted by e. An adaptive filter identifies an equivalent filter that is seen from the speaker 140 to the microphone 130. This represents the transfer function of the room in which the speaker 140 and the microphone 130 are located. The transfer function depends on the physical characteristics of the environment. In broad terms, a small room with absorbing walls originates only a few, first order reflections so that its transfer function has a short impulse response, thereby allowing the facility of echo cancellation.

Figure 2:
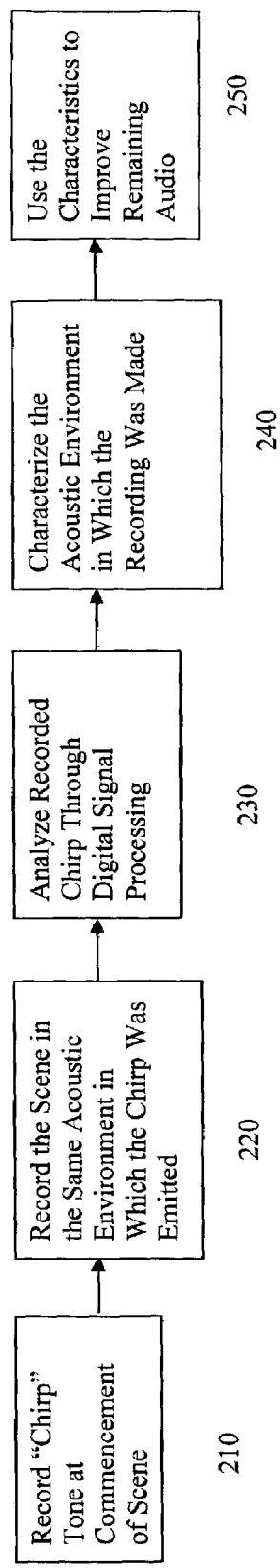
FIG. 2 is a flowchart illustrating the operations involved in improving audio quality of video recordings during post-production, according to an embodiment of the present invention.

As illustrated in FIG. 2, the operations involved in improving the audio quality of video recordings include recording a "chirp" tone at the commencement of a scene, as shown in operation 210; recording the scene in the same acoustic environment in which the chirp tone was emitted, as depicted in step 220; analyzing the recorded chirp through signal processing on a computer 110, as illustrated in operation 230; characterizing the acoustic environment in which the recording was made, as depicted in operation 240; and using the characteristics to improve the remainder of the audio in the video recording, as shown in operation 250. The types of processing that can be done by the computer 110 include, for example, frequency response correction and acoustic echo cancellation.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A system, comprising:
 a device that generates a chirp tone;
 a video recorder, having a speaker for emitting and recording the chirp tone; and
 a computer that analyzes the chirp tone to improve audio quality of video recordings.

2. The system of claim 1, wherein the chirp-generating device is built into the video recorder.

3. The system of claim 2, wherein the chirp-generating device may be triggered automatically by a user when the user commences recording.

4. The system of claim 1, wherein the chirp-generating device is an add-on device placed in physical proximity to the video recorder.

5. The system of claim 1, wherein the video recorder is a digital video recorder.

6. The system of claim 1, wherein the computer is built into the video recorder.

7. The system of claim 1, wherein the computer is coupled to the video recorder.

8. The system of claim 1, wherein the computer characterizes the acoustic environment in which the chirp tone was recorded and uses those characteristics to improve any remaining audio portion of a video recording, through signal processing.

9. The system of claim 8, wherein the signal processing is achieved through at least one of a digital signal processor, an application specific integrated circuit, or software.

10. The system of claim 8, wherein the digital signal processing includes at least one of frequency response correction and acoustic echo cancellation.

11. The system of claim 5, wherein the computer locates scene changes in a data portion of a video stream and uses the scene changes to find the chirp tone.

12. The system of claim 1, wherein the computer optically detects scene changes to localize a search for the chirp tone.

13. The system of claim 1, wherein the video recorder has a microphone.

14. A method for improving audio quality of a video recording, comprising:
 recording a chirp tone, within an acoustic environment, during commencement of a scene that is being recorded by a video recorder;
 recording the scene in the acoustic environment in which the chirp tone was emitted;
 analyzing the recorded chirp tone via signal processing;
 characterizing the acoustic environment in which the recording was made; and
 using the characteristics to improve any remaining audio portion of the video recording.

15. The method of claim 14, wherein a chirp-generating device is installed in the video recorder.

16. The method of claim 14, wherein a chirp-generating device is an add-on device that is placed in physical proximity to the video recorder while the chirp is generated.

17. The method of claim 14, wherein the signal processing is achieved by a computer.

18. The method of claim 15, wherein the computer is installed in the video recorder.

19. The method of claim 15, wherein the signal processing is achieved through at least one of a digital signal processor, an application specific integrated circuit, and software.

20. The method of claim 17, wherein the signal processing includes at least one of frequency response correction and acoustic echo cancellation.

21. An article comprising:
 a storage medium having stored thereon instructions that when executed by a machine result in the following:
 an analysis of a chirp, that is recorded during commencement of a video scene captured on a video recorder, within an acoustic environment;
 a characterization of the acoustic environment in which the recording was made; and
 an improvement of remaining audio portions of the video scene via signal processing.

22. The article of claim 21, wherein the signal processing includes at least one of frequency response correction and acoustic echo cancellation.

23. The article of claim 21, wherein the machine is built into the video recorder.

24. The article of claim 21, wherein the chirp is generated by a device built into the video recorder.

25. The article of claim 21, wherein the chirp is generated by an add-on device situated in close proximity to the video recorder.

26. The article of claim 21, wherein the video recorder is a digital video recorder.

* * * * *